Patented Sept. 17, 1940

2,215,304

UNITED STATES PATENT OFFICE 2,215,304

CATALYST REGENERATION

Alexis Voorhies, Jr., Baton Rouge, La., assignor to Standard Oil Development Company, a corporation of Delaware No Drawing. Application April 5, 1938,
Serial No. 200,151

2 Claims. (Cl. 252—242)

This invention relates to the regeneration of adsorptive contact masses which have become fouled with carbonaceous deposits and pertains more particularly to the regeneration of synthetic adsorbent materials having a porous gel structure.

Within recent years the catalytic cracking of hydrocarbon oil in the presence of adsorbent clays which are naturally active or which have been made active by suitable processing such as by acid treatment has become more wide spread due to increased demand for gasoline of higher and higher anti-knock properties. It is known that the use of such catalysts results in the production of gasoline of higher octane number than that produced by conventional thermal cracking methods.

One disadvantage of catalytic cracking, however, is that the adsorptive clays become fouled more or less rapidly during the cracking operation with solid carbonaceous deposits which must be periodically removed to restore the efficiency of the catalyst. The removal of such deposits is commonly accomplished by passing air or oxidizing gas through the fouled catalyst heated to ignition temperature. Such burning operation results in the evolution of considerable heat and unless the temperature is controlled during this burning or regenerating period the activity of the catalyst becomes permanently impaired or virtually destroyed. One method commonly used to control regenerating temperature is to dilute the oxidizing gas with steam to lower the rate of combustion and increase the capacity of the gases to remove the heat of reaction.

As a substitute for active or activated clays for cracking petroleum oil, it has also been proposed to employ synthetic adsorptive products having a porous capillary structure such as silica gel combined with other gels having catalytic activity. For example, it has been found that synthetic silica-alumina gels formed by impregnating silica hydrogel with aluminum nitrate and subsequently decomposing the nitrate or the plural gel of silica and alumina formed from a single hydrogel containing colloidal silica and alumina, have initial cracking activities materially higher than active or activated clays. However when such gels are regenerated in the conventional manner employing steam as a diluent for the air, the activity of such catalysts drops to a much lower order.

The principal object of the present invention is to provide an improved method of regenerating such synthetic gel catalysts so that the catalyst may be maintained at a higher order of activity despite repeated cracking and regenerating cycles.

Other objects and advantages of the invention will be apparent from the more detailed description hereinafter.

It has been discovered that whereas steam may be used to advantage as a diluent for the air or other oxidizing gas in the regeneration of active or activated clays, the presence of substantial amounts of steam during the regeneration of synthetic gels, especially silica-alumina gels of the type heretofore mentioned, is largely responsible for the materially lower activity of such catalyst following regeneration.

In accordance with the present invention, such synthetic gels containing carbonaceous deposits are regenerated with air diluted with relatively dry incombustible gases other than steam, such as nitrogen, carbon dioxide, spent combustion gases or the like.

I have found that when employing relatively dry nitrogen as a diluent gas during regeneration of such synthetic gels, the catalyst may be made to maintain its high initial activity over repeated cracking and regenerating cycles for an indeterminate period and in some cases it has been observed that the activity of the catalyst has actually increased following such regeneration.

It will be understood that to maintain the desired regeneration temperature such as below 1000° F. it is necessary to dilute the air with large volumes of inert gases, for example, the volume of diluent gases employed during the first stage of regeneration may be of the order of from 5 to 20 or more times the volume of air. The presence of steam in relatively small amounts such as 10% or even as high as 15% will not result in irreparable injury to the catalyst. The term "relatively dry inert gases" will be understood to mean inert gases containing not more than 15% steam or water vapor. It is preferred, however, to regenerate with gases which are virtually free of steam.

The following examples will serve to illustrate the advantage of the present invention, it being understood that the specific conditions expressed therein are illustrative rather than limitive.

In each of the examples given hereinafter, the activity of the catalyst is expressed as the per cent yield of 400° F. end point liquid distillate formed by passing a 33.8 A. P. I. gravity virgin East Texas gas oil over a bed of catalyst maintained at 850° F. at a space velocity of 0.6 volumes of liquid feed per volume of catalyst per hour over 2 hour cracking period.

Example 1

A cracking catalyst in pellet form consisting of a plural gel of silica and alumina, formed by adding aluminum sulphate to sodium silicate under such conditions as to form a colloidal solution of silica and alumina having a mole ratio of silica and alumina of about 10 to 1 which had been neutralized, washed, dried and activated at 800° F. for 4 hours, was subjected to repeated cracking cycles under conditions above specified with intervening regenerations in which the regenerating gas consisted of air diluted with nitrogen in such proportions as to maintain the regenerating temperature below 1000° F. The first cracking cycle resulted in a 47.5% yield. At the end of the sixth cracking cycle the yield was still 47%.

Example 2

The same conditions and catalyst disclosed in Example 1 was employed except that steam was used as a diluent for the regenerating gas instead of nitrogen. The yield in the first cycle was 46% whereas in the third cycle the yield had dropped to 34% and at the end of the sixth cycle it was 33.5%.

Example 3

Activated clay of the type known under the trade name of super filtrol was tested under similar conditions to determine the effect of steam in regenerating gases and catalyst activity. In this case employing steam as a diluent, the first cycle resulted in a conversion of 39.0% whereas at the end of the sixth cycle the conversion was still 37.0% showing that the presence of steam has little, if any, harmful effect on the activity of clays.

Example 4

Another synthetic gel catalyst formed by impregnating silica hydrogel with aluminum nitrate and afterwards heating to decompose the nitrate to aluminum oxide was also tested under conditions specified in Example 1 employing nitrogen and carbon dioxide as diluents for the regenerating gas. In this case, the conversion during the first cycle was 39% whereas in the eighth cycle it was still 38.5%.

Example 5

The same catalyst specified in Example 4 was tested in the same manner except that steam rather than nitrogen was used as a diluent. The initial conversion during the first cycle amounted to 39.5% whereas in the eighth cycle it had dropped to 32%.

Example 6

A catalyst prepared as described in Example 1 was subjected to repeated cracking and regeneration for about 50 cracking cycles using nitrogen or spent combustion gases as regenerating diluent. The yield during the first cycle was 43.0% whereas at the end of the fiftieth cycle it was still 39%. The run was then continued except that steam was used in place of spent combustion gas. Following the first regeneration employing steam as a diluent the conversion dropped from 39% to 31% and at the end of the sixth cycle using steam, the conversion dropped to 28%. On further continuing the run by again replacing the steam with spent combustion gases, the yields slightly improved, amounting to 30%.

While the invention has been described with reference to the regeneration of cracking catalyst, in which it has been found to be of particular advantage, it is not my intention to restrict the invention thereto as it will have a broader application.

Having described the specific embodiment and given specific examples thereof, it will be understood that the invention embraces such other modifications and variations as come within the scope of the appended claims.

I claim:

1. In a method of regenerating synthetic gel catalysts, containing substantial amounts of alumina, to remove relatively hard dry carbonaceous deposits resulting from the high temperature conversion of hydrocarbon oils wherein the regeneration is accomplished by oxidation of said carbonaceous deposits with an oxidizing gas and wherein the oxygen concentration of said gas is maintained below that of air at least during the major portion of the regenerating period to avoid excessive temperatures which would otherwise permanently impair the activity of the catalyst; the improvement which comprises contacting said catalyst with a regenerating gas comprising a mixture of air and spent combustion gas at a temperature sufficient to oxidize said carbonaceous deposits, and maintaining the water vapor content of said regenerating gas below 10% to avoid impairing the activity of the catalyst.

2. In a method of regenerating synthetic gel catalysts comprising silica and alumina, to remove relatively dry carbonaceous deposits resulting from the high temperature conversion of hydrocarbon oils wherein the regeneration is accomplished by oxidation of said carbonaceous deposits with an oxidizing gas and wherein the oxygen concentration of said oxidizing gas is maintained below that of air during at least the major portion of the regenerating period to avoid excessive temperatures which would otherwise impair the activity of the catalysts; the improvements which comprises passing a stream of regenerating gas consisting of a mixture of air and spent combustion gas in contact with said catalysts at a temperature sufficient to oxidize said carbonaceous deposits and keeping the regenerating gas passing in contact with said catalysts substantially free of water vapor to avoid impairing the activity of the catalysts.

ALEXIS VOORHIES, Jr.